(12) United States Patent
Lichtenauer et al.

(10) Patent No.: US 8,968,634 B2
(45) Date of Patent: Mar. 3, 2015

(54) METHOD FOR PRODUCING AN ARTICLE FROM THERMOPLASTIC MATERIAL

(75) Inventors: Andreas Lichtenauer, Bonn (DE); Stefan Walbroel, Sankt Augustin (DE)

(73) Assignee: Kautex Maschinenbau GmbH, Bonn (DE)

( * ) Notice: Subject to any disclaimer, the term of this patent is extended or adjusted under 35 U.S.C. 154(b) by 471 days.

(21) Appl. No.: 13/382,053

(22) PCT Filed: Jun. 23, 2010

(86) PCT No.: PCT/EP2010/003830
§ 371 (c)(1),
(2), (4) Date: Mar. 19, 2012

(87) PCT Pub. No.: WO2011/000504
PCT Pub. Date: Jan. 6, 2011

(65) Prior Publication Data
US 2012/0161371 A1    Jun. 28, 2012

(30) Foreign Application Priority Data
Jul. 1, 2009  (DE) .......................... 10 2009 031 441

(51) Int. Cl.
*B29C 49/16*    (2006.01)
*B29C 49/20*    (2006.01)
(Continued)

(52) U.S. Cl.
CPC ................. *B29C 49/20* (2013.01); *B29C 49/04* (2013.01); *B29C 49/16* (2013.01); *B29C 49/48* (2013.01); *B29C 49/60* (2013.01); *B29C 2049/2008* (2013.01); *B29C 2049/2013* (2013.01); *B29C 2049/2073* (2013.01); *B29C 2049/5837* (2013.01); *B29C 2049/609* (2013.01); *B29C 2791/006* (2013.01); *B29C 2791/007* (2013.01);
(Continued)

(58) Field of Classification Search
None
See application file for complete search history.

(56) References Cited

U.S. PATENT DOCUMENTS 3,300,556 A    1/1967  Battenfeld, et al.
3,954,369 A    5/1976  Kormendi
(Continued)

FOREIGN PATENT DOCUMENTS

DE    1801966    6/1970
DE    2933212    2/1981
(Continued)

OTHER PUBLICATIONS

XP002612713, Database WPI, Thomson Scientific, London, 1999 (cited in PCT Search Report), 2 pgs.
(Continued)

*Primary Examiner* — Monica Huson
(74) *Attorney, Agent, or Firm* — Grossman Tucker Perreault & Pfleger, PLLC

(57) ABSTRACT

The invention relates to a method for producing an article from thermoplastic material in which a tube-shaped preform is introduced into a multi-part blow mold and is expanded and formed by applying differential pressure, wherein, before the forming of the preform, at least one insert is introduced into the preform by means of a first holding means and wherein, before the forming of the preform, the insert is taken over by at least one second holding means puncturing the wall of the preform, the second holding means being formed as a blowing pin and an expansion and re-forming of the preform taking place by applying pressure medium with the second holding means.

45 Claims, 3 Drawing Sheets

Figure 1:
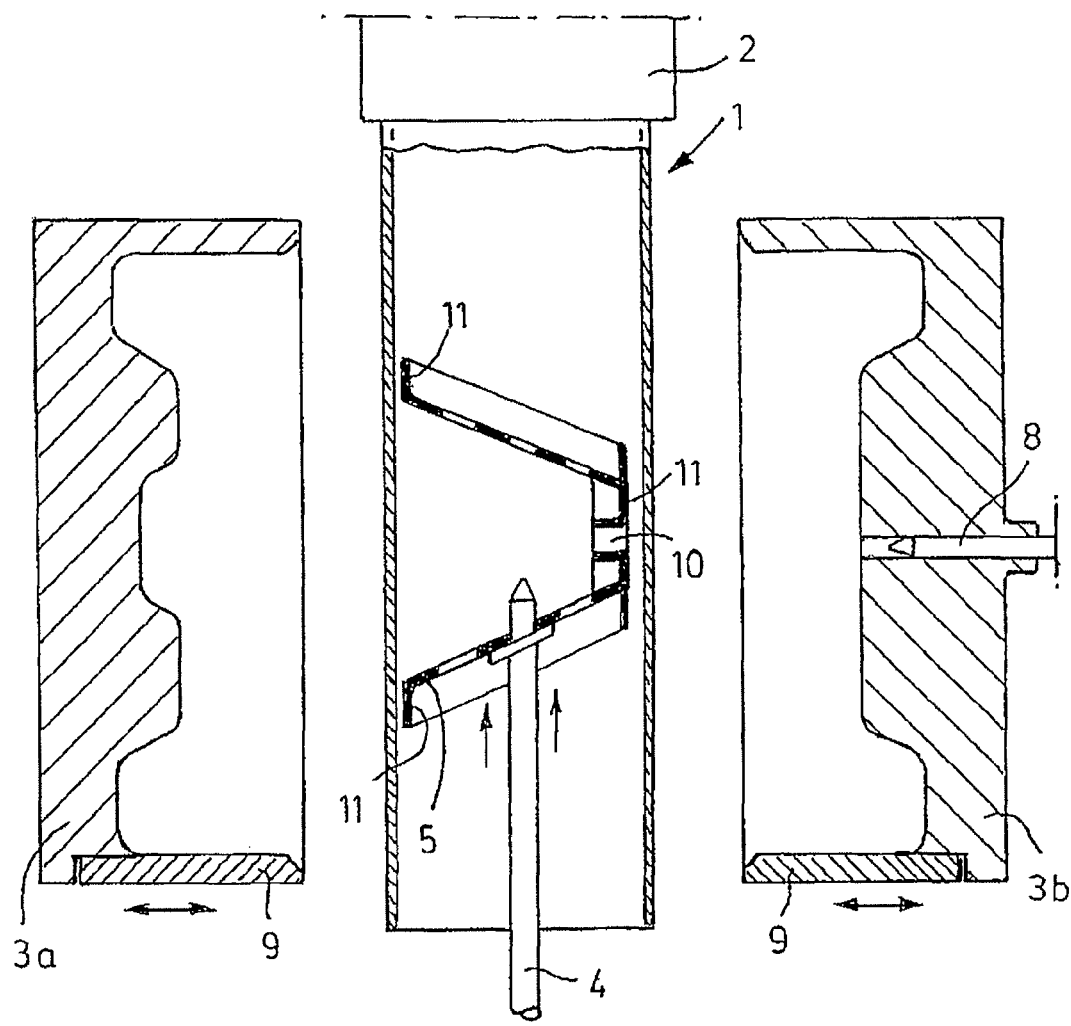

(51) Int. Cl.
  *B29C 49/04* (2006.01)
  *B29C 49/48* (2006.01)
  *B29C 49/60* (2006.01)
  *B29C 49/58* (2006.01)
  *B29K 27/06* (2006.01)
  *B29L 31/00* (2006.01)

(52) U.S. Cl.
  CPC ..... *B29K 2027/06* (2013.01); *B29L 2031/7172* (2013.01)
  USPC .......................................... 264/523; 264/529

(56) References Cited

U.S. PATENT DOCUMENTS

| | | | |
|---|---|---|---|
| 4,952,347 | A | 8/1990 | Kasugai |
| 5,326,514 | A | 7/1994 | Linden et al. |
| 6,866,812 | B2 | 3/2005 | Van Schaftingen et al. |
| 6,978,802 | B2 | 12/2005 | Hagano et al. |
| 2009/0250846 | A1 | 10/2009 | Criel et al. |
| 2010/0126659 | A1 | 5/2010 | Roos et al. |

FOREIGN PATENT DOCUMENTS

| | | |
|---|---|---|
| DE | 8225986 | 6/1985 |
| DE | 19600872 | 7/1997 |
| EP | 0103832 | 3/1984 |
| JP | 55007405 | 1/1980 |
| JP | 56051333 | 5/1981 |
| JP | 61110529 | 5/1986 |
| JP | 11254511 | 9/1999 |
| JP | 2006015744 | 1/2006 |

OTHER PUBLICATIONS

PCT Search Report dated Jul. 5, 2011, received in corresponding PCT Application No. PCT/EP2010/003752.
PCT Written Opinion dated Jul. 5, 2011, received in corresponding PCT Application No. PCT/EP2010/003752.
PCT English Translation of the International Preliminary Report on Patentability mailed Jan. 26, 2012, received in corresponding PCT Application No. PCT/EP2010/003752.
PCT Search Report dated Jan. 3, 2011, received in corresponding PCT Application No. PCT/EP2010/003830.
PCT English Translation of the International Preliminary Report on Patentability mailed Jan. 26, 2012, received in corresponding PCT Application No. PCT/EP2010/003830.
English translation of Japanese Office Action mailed Mar. 11, 2014, received in related Japanese Patent Application No. 2012-516577, 3 pgs. (references previously cited).
English translation of Japanese Office Action mailed Mar. 11, 2014, received in related Japanese Patent Application No. 2012-516564, 2 pgs. (references previously cited).

METHOD FOR PRODUCING AN ARTICLE FROM THERMOPLASTIC MATERIAL

The invention relates to a method for producing an article from thermoplastic material by extrusion blow molding.

In extrusion blow molding, a tube-shaped preform tube of softened thermoplastic material is generally discharged/extruded from an annular die and brought between the opened halves of a multi-part blow molding tool. Alternatively, the extruder head may be arranged above the tool in such a way that the preform is extruded such that it is hanging between the opened parts of the tool. The tool closes around the preform and the preform is expanded within a cavity of the blow mold, generally by introducing a pressure medium. The cavity of the blow mold defines the finished shape of the article to be produced. In blow molding, the initial and subsequent forming of the article generally take place in the first heat of the polymer material extruded in a warm and plastic state.

Extrusion blow molding is used to produce both small and large hollow bodies, such as for example phials, bottles, drums, motor vehicle fuel tanks through to large heating oil tanks. It is sometimes necessary to introduce inserts into the articles to be produced. In particular in the production of fuel tanks, functional inserts, such as for example pumps, indicators, surge chambers, internal baffles and the like, have to be provided in the tank. Since, owing to their size, these components cannot easily be introduced subsequently into the finished tank through openings to be provided therein, there have been various instances where such inserts are instead encapsulated by blow molding. In principle, it is known in the prior art to introduce inserts that are to be arranged in the tank into the preform, which has been opened and placed between the blow mold halves, by means of a loading pin from below and to close the blow mold around the tube and the inserts surrounded by said tube.

For this purpose, it is advantageous to move the loading pin or the holding means for the insert out from the preform before the blow mold is closed. This in turn requires at least temporary holding of the insert inside the preform.

A method for producing an extrusion blow molded plastic article with an insert is known, for example, from WO 2008/138869 A1. There, the insert is introduced into the lower leading open end of the preform formed as a tube by means of a loading pin when or while the preform is being extruded between the opened parts of the blow molding tool. In a further step, the preform is pre-inflated and the insert is subsequently fixed with respect to the tool by means of slides/mold spacers provided in the tool, the preform at the same time being fused with the insert at the corresponding locations. The loading pin is moved out from the tool, then the tool closes around the preform with the insert fixed in it and the blow molding of the article is completed.

This solution entails the disadvantage that the tool required for producing the article is relatively expensive and complex due to the slides to be provided in it.

The invention is therefore based on the object of providing a comparable method which can be realized by comparatively simpler means. The invention is also based on the object of providing a method for producing an extrusion blow molded plastic article with inserts and is optimized with regard to the number and size of the openings provided on the finished container or tank. This is desirable in particular in the production of fuel tanks from thermoplastic material, which are usually produced from co-extrudates with barrier layers for hydrocarbons.

The object is achieved according to the invention by a method for producing an article from thermoplastic material in which a tube-shaped preform is introduced into a multi-part blow mold and is expanded and formed by applying differential pressure, wherein, before the forming of the preform, at least one insert is introduced into the preform by means of a first holding means and wherein, before the forming of the preform, the insert is taken over by at least one second holding means puncturing the wall of the preform, the second holding means being formed as a blowing pin and an expansion and re-forming of the preform taking place by applying pressure medium with the second holding means or through the second holding means.

The terms "blowing pin" and "blowing needle" are used synonymously hereafter. A person skilled in the art is familiar with the two terms referring to the same thing.

The solution according to the invention has the advantage in particular that the blowing needle that is required in any case or the blowing pin that is required in any case serves at the same time for fixing the insert to be introduced into the article. If required, it is also possible for a number of blowing needles to be used for the fixing. The required tool is much simpler than the tool known from WO 2008/138869 A1.

For the purposes of the present invention, a tube-shaped preform does not necessarily have to be a tube that is closed over its entire circumference, but rather a tube-shaped preform can also be understood for example as meaning a tube that is separated lengthwise on one side. The cross section of the "tube-shaped preform" also does not necessarily have to be circular; rather, a manipulation of the preform after it leaves the extruder head and before the insert is introduced between the opened parts of the blow molding tool is also within the scope of the invention.

Although, as still to be described below, it is envisaged in the case of an exemplary embodiment according to the invention to extrude the preform between the halves of an opened blow molding tool such that it is hanging in the direction of gravitational force, the preform may also be extruded at a location spatially remote from the blow molding tool and be brought to the blow molding tool by corresponding gripping devices.

Within the scope of the invention, the preform may be extruded continuously or discontinuously.

In the case of the exemplary embodiment described in the application, the preform is expanded by applying pressure medium in the form of blowing air. It is also within the scope of the invention to support the forming of the article by negative pressure applied in the tool.

Although the blow molding tool is described hereafter as a two-part blow molding tool, it may have more than two parts; in particular, individual mold parts that are movable with respect to the separating plane of the tool defined by the preform may be provided.

In the case of an advantageous variant of the method according to the invention, it is provided that the first holding means is moved out from the preform after the insert has been taken over by the second holding means. The first holding means, as a loading pin, is expediently provided with means for receiving the insert.

Expediently, the preform is closed at its ends after the first holding means have been moved out and is pre-inflated by means of the second holding means before the blow mold is closed.

Alternatively, the preform may be closed at its upper end and pre-inflated by means of the first holding means before the first holding means have been moved out. In the case of this variant, the first holding means serves for the pre-inflation of the tube, so that the blowing pin or the blowing needle can be inserted into the pre-expanded and stabilized tube. In the case of this variant of the method, it is advisable and expedient to close the leading end of the tube by means of a correspondingly formed closing flap. After the loading pin has been moved out, the remaining opening should likewise be closed by suitable means, in order that the pre-inflation and main inflation are not interrupted.

When the preform is being pre-inflated by means of the second holding means, the tube may be provisionally closed at its leading/lower end by means of mold spacers or slides of the tool. However, it is also possible for the tube to be closed for the purpose of pre-inflation by means that are physically separate from the tool, for example by means of a gripper or a tube closing device. The upper end of the tube adjacent the extruder head must also be provisionally closed for the purpose of pre-inflation. This may likewise take place by means of mold spacers or slides of the tool or by means of means that are physically separate from the tool, for example by means of a gripper or tube closing device.

In the case of a variant of the method according to the invention, it is provided that the article to be produced is a motor vehicle fuel tank.

An example that comes into consideration as an insert that is introduced into the article is a functional component carrier.

The insert may alternatively be introduced into the article as a stiffening element which preferably supports opposing walls of the article with respect to each other. A functional component carrier and a stiffening element may also be realized in one and the same component.

For the purposes of the invention, opposing does not necessarily have to mean diametrically opposing. Depending on the geometry of the article to be produced, support may also be provided from areas of the article that are offset in relation to one another.

It is alternatively possible to introduce the insert into the article in such a way that it is only connected to a wall or a wall region of the article. For example, the insert may be attached to a single wall of the article by an advancing and/or withdrawing movement of the second holding means.

The insert is preferably fused with the inner wall of the article. For this purpose, it is advisable to produce the insert from a material that is compatible with the wall of the container or tank in the sense of fusibility. If, for example, a motor vehicle fuel tank is produced by the method according to the invention, the preform may, for example, consist of a multi-layered extrudate with barrier layers for hydrocarbons. The material will in this case consist predominantly of HDPE with EVOH barrier layers. Expediently, the insert is then likewise a component of HDPE (high-density polyethylene), which can be fused with the material of the preform/article.

In the case of an expedient refinement of the method according to the invention, the insert is passed through by the second holding means. The design of the insert may be chosen such that the second holding means in the form of the blowing pin passes through the insert at a favorable location in such a way that the opening to be produced in the wall of the container or tank has a position which is, for example, intended in any case for an opening that is to be provided in the container or tank, so that it is not necessary to close the hole produced by the blowing pin/the second holding means by means of a plug and/or cover provided for this purpose.

The second holding means may expediently be temporarily locked together with, i.e. positively connected to, the insert. For example, the second holding means may be conically formed in certain regions or certain portions, so that, by means of an advancing or withdrawing movement of the holding means, the insert can be attached to the one or the other opposing wall of the article without necessarily also having to be supported against the other wall of the container or tank.

Depending on the position and arrangement and the form of the insert, it may however be sufficient to penetrate the insert with the blowing pin in such a way that it is only necessary to secure the insert in the direction of gravitational force. This has the advantage that the holding means in the form of the blowing pin can be of a relatively simple form.

For this purpose, the insert may have suitable mounting/positioning openings.

Figure 2:
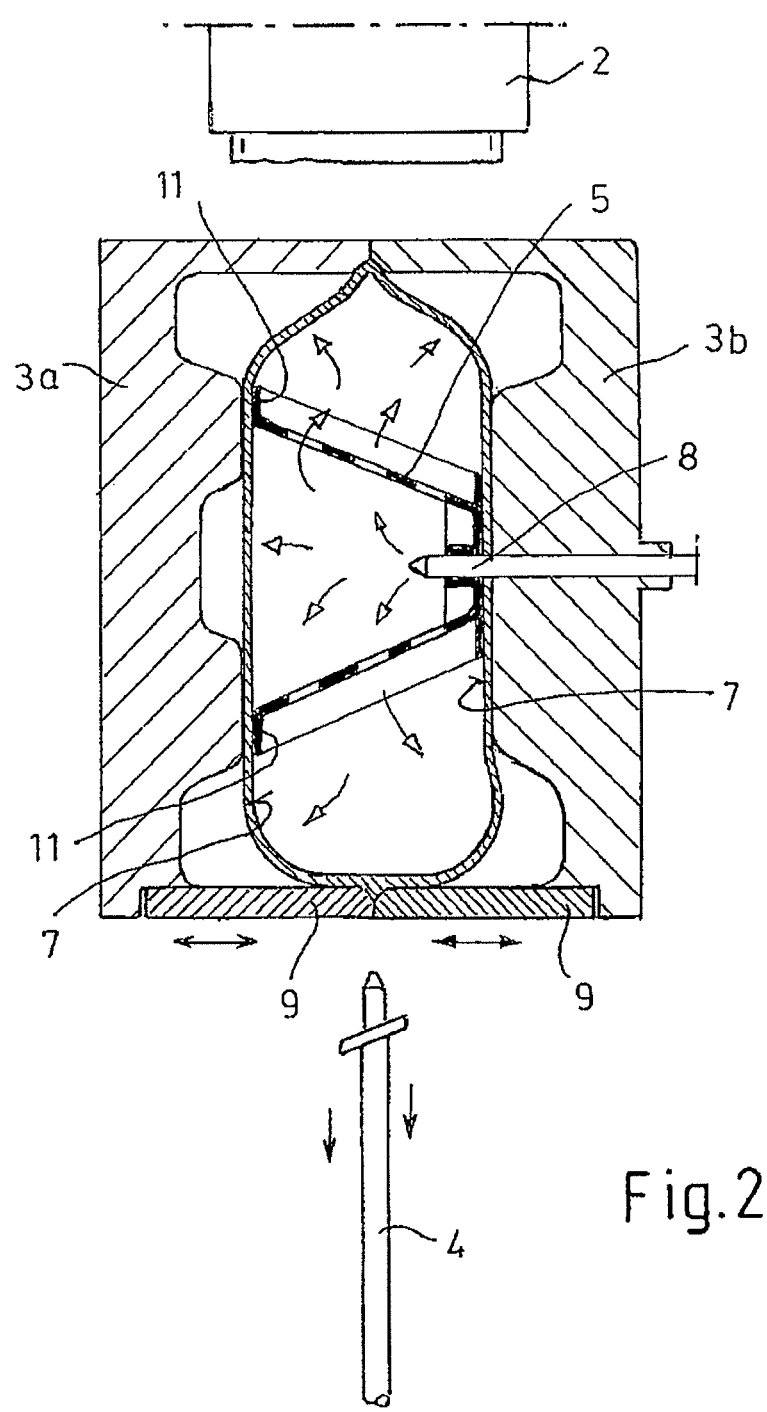
Figure 3:
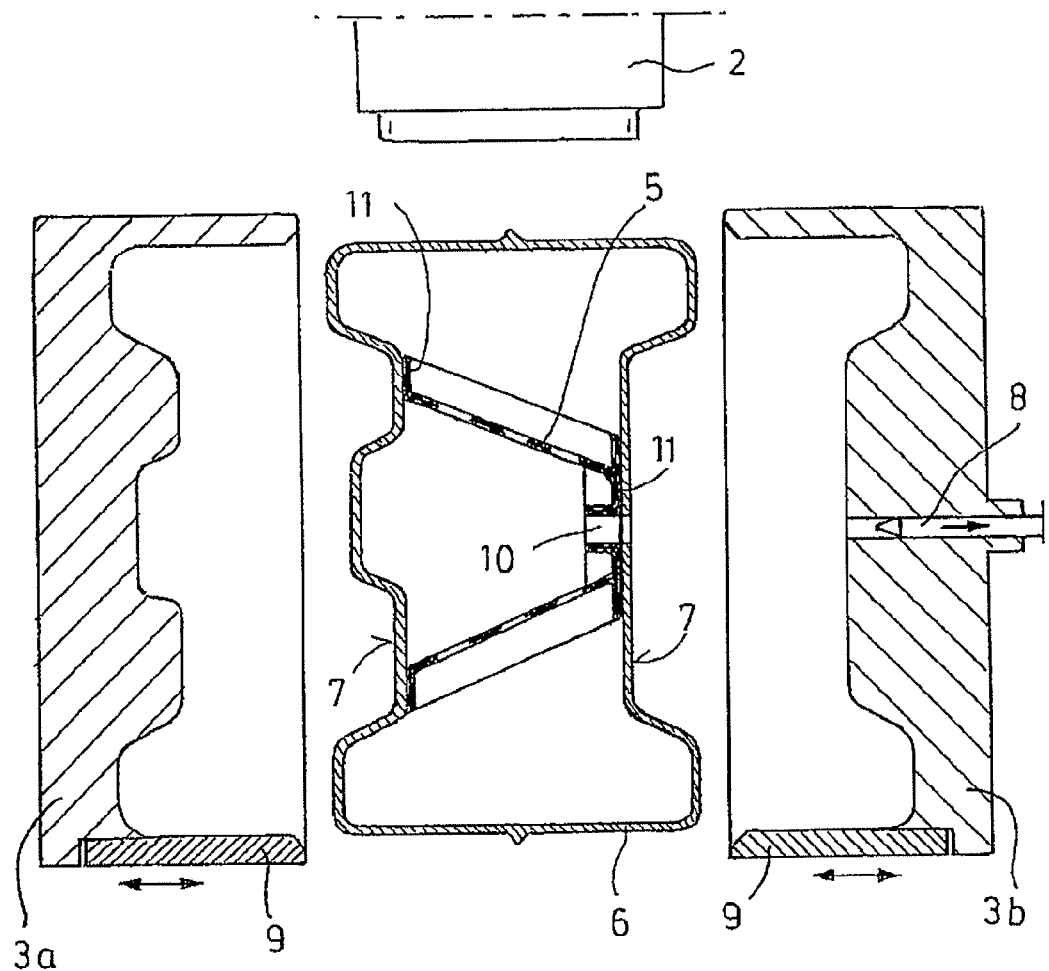

The invention is explained below on the basis of an advantageous exemplary embodiment that is represented in the drawings, in which:

FIG. 1 shows a sectional view through part of the blow mold and through the preform during the introduction of the insert into the preform, FIG. 2 shows a sectional view through the closed blow mold during the expansion of the pre-form and FIG. 3 shows a sectional view corresponding to FIG. 2 during the removal of the finished article.

In the case of the method according to the invention, firstly a tube-shaped preform 1 is discharged continuously from an extruder head 2 with an annular die (not represented) such that it is hanging in the direction of gravitational force. The preform 1 is extruded between the open blow mold halves 3a, 3b of a blow molding tool.

The blow molding tool is shown in a greatly simplified form in the drawing. The blow mold halves, which may each be of a multi-part form, may be arranged in a known way on platens of a mold clamping frame, which is not represented.

Before, during or after the extrusion of the preform 1 to the length shown in FIG. 1, a loading pin 4 is arranged between the blow mold halves 3a, 3b from below as a first holding means with a functional component carrier 5 positioned thereupon as an insert.

The article to be produced (see FIG. 3) takes the form of a plastic fuel tank 6 with a functional component carrier 5 to be arranged in it. The functional component carrier 5 receives functional components (not represented) for the fuel tank, for example a feed unit with a surge chamber and a fuel pump, filling-level indicators or the like.

As still to be described below, in the case of the exemplary embodiment described here the functional component carrier 5 is formed such that it brings about a stiffening of the finished fuel tank 6 in such a way that it supports its opposing walls 7 with respect to each other.

As shown in FIG. 1, a blowing pin 8 is arranged in a retractable and extendable manner in the blow mold half 3b (shown on the right in FIG. 1).

Once the functional component carrier 5 has been positioned by the loading pin 4 within the preform 1 between the blow mold halves 3a, 3b, the blowing pin 8 is inserted into the not pre-expanded/not pre-inflated preform 1. The blowing pin 8 thereby takes over the functional component carrier 5. The loading pin 4 is moved out from between the blow mold halves 3a, 3b. Then, the ends of the preform 1, both on the side facing the extruder head 2 and on the leading side, are closed. On the leading side of the preform 1, the closing takes place by means of the mold spacers (slides) 9 that are represented in the figures. The preform 1 is pre-inflated, then the blow mold halves 3a, 3b are closed completely. The blow molding of the article is subsequently completed.

As mentioned in the introductory part of the description, alternatively a pre-inflation may be performed by means of the loading pin 4. In this case, the loading pin 4 is removed from the preform 1 after the pre-inflation.

In the drawings, the state in which the blow mold halves 3*a*, 3*b* have been closed completely is represented in FIG. 2.

Immediately before the loading pin 4 has been moved out from between the blow mold halves 3*a*, 3*b*, the functional component carrier 5 has been penetrated by the blowing pin 8 at an opening 10 provided for this purpose, so that the functional component carrier 5 is held in the position shown in FIG. 2 in the direction of gravitational force by the blowing pin 8.

Thereafter, as illustrated in FIG. 2, the preform 1 is expanded completely by introducing pressure medium (blowing air), until it has assumed the finished shape shown in FIG. 3.

The functional component carrier 5 lies with its supporting surfaces 11 against the wall 7 of the preform 1 when the blow mold halves 3*a*, 3*b* are closed. After complete expansion of the preform 1 to form the fuel tank 6 represented in FIG. 3, said tank can be removed from the tool as a finished article.

Not shown are the closing, pinching off and/or separating of the preform 1 on its side facing the extruder head 2. However, the method steps concerned are known in principle in the prior art.

LIST OF DESIGNATIONS

1 Preform
2 Extruder head
3*a*, 3*b* Blow mold halves
4 Loading pin
5 Functional component carrier
6 Fuel tank
7 Walls
8 Blowing pin
9 Mold spacers
10 Opening
11 Supporting surfaces

What is claimed is:

1. A method for producing an article from thermoplastic material in which a tube-shaped preform is introduced into a multi-part blow mold and is expanded and formed by applying differential pressure, wherein, before the forming of the preform, at least one insert is introduced into the preform by means of a first holding means and wherein, before the forming of the preform, the insert is taken over by at least one second holding means puncturing the wall of the preform, the second holding means being formed as a blowing pin and an expansion and forming of the preform taking place by applying pressure medium with the second holding means, and characterized in that the first holding means is moved out from the preform after the insert has been taken over by the second holding means.

2. The method as claimed in claim 1, characterized in that the preform is closed at its ends after the first holding means have been moved out and is pre-inflated by means of the second holding means before the blow mold is closed.

3. The method as claimed in claim 1, characterized in that the preform is closed at its upper end and pre-inflated by means of the first holding means before the first holding means have been moved out.

4. The method as claimed in claim 1, characterized in that the article to be produced is a motor vehicle fuel tank.

5. The method as claimed in claim 1, characterized in that a functional component carrier is introduced into the article as the insert.

6. The method as claimed in claim 1, characterized in that a stiffening element is introduced into the article as the insert.

7. The method as claimed in claim 1, characterized in that the insert is attached to a single wall of the article by an advancing and/or withdrawing movement of the second holding means.

8. The method as claimed in claim 1, characterized in that the insert is fused with the inner wall of the article.

9. The method as claimed in claim 1, characterized in that the second holding means passes through the insert.

10. The method as claimed in claim 1, characterized in that the second holding means is temporarily locked together with the insert.

11. The method as claimed in claim 1, characterized in that the insert supports opposing walls of the article with respect to each other.

12. A method for producing an article from thermoplastic material in which a tube-shaped preform is introduced into a multi-part blow mold and is expanded and formed by applying differential pressure, wherein, before the forming of the preform, at least one insert is introduced into the preform by means of a first holding means and wherein, before the forming of the preform, the insert is taken over by at least one second holding means puncturing the wall of the preform, the second holding means being formed as a blowing pin and an expansion and forming of the preform taking place by applying pressure medium with the second holding means, and characterized in that the first holding means is moved out from the preform and the preform is closed at its ends after the first holding means have been moved out and is pre-inflated by means of the second holding means before the blow mold is closed.

13. The method as claimed in claim 12, characterized in that the article to be produced is a motor vehicle fuel tank.

14. The method as claimed in claim 12, characterized in that a functional component carrier is introduced into the article as the insert.

15. The method as claimed in claim 12, characterized in that a stiffening element is introduced into the article as the insert.

16. The method as claimed in claim 12, characterized in that the insert is attached to a single wall of the article by an advancing and/or withdrawing movement of the second holding means.

17. The method as claimed in claim 12, characterized in that the insert is fused with the inner wall of the article.

18. The method as claimed in claim 12, characterized in that the second holding means passes through the insert.

19. The method as claimed in claim 12, characterized in that the second holding means is temporarily locked together with the insert.

20. The method as claimed in claim 12, characterized in that the insert supports opposing walls of the article with respect to each other.

21. A method for producing an article from thermoplastic material in which a tube-shaped preform is introduced into a multi-part blow mold and is expanded and formed by applying differential pressure, wherein, before the forming of the preform, at least one insert is introduced into the preform by means of a first holding means and wherein, before the forming of the preform, the insert is taken over by at least one second holding means puncturing the wall of the preform, the second holding means being formed as a blowing pin and an expansion and forming of the preform taking place by applying pressure medium with the second holding means, and characterized in that the first holding means is moved out from the preform and the preform is closed at its upper end and pre-inflated by means of the first holding means before the first holding means have been moved out.

22. The method as claimed in claim 21, characterized in that the article to be produced is a motor vehicle fuel tank.

23. The method as claimed in claim 21, characterized in that a functional component carrier is introduced into the article as the insert.

24. The method as claimed in claim 21, characterized in that a stiffening element is introduced into the article as the insert.

25. The method as claimed in claim 21, characterized in that the insert is attached to a single wall of the article by an advancing and/or withdrawing movement of the second holding means.

26. The method as claimed in claim 21, characterized in that the insert is fused with the inner wall of the article.

27. The method as claimed in claim 21, characterized in that the second holding means passes through the insert.

28. The method as claimed in claim 21, characterized in that the second holding means is temporarily locked together with the insert.

29. The method as claimed in claim 21, characterized in that the insert supports opposing walls of the article with respect to each other.

30. A method for producing an article from thermoplastic material in which a tube-shaped preform is introduced into a multi-part blow mold and is expanded and formed by applying differential pressure, wherein, before the forming of the preform, at least one insert is introduced into the preform by means of a first holding means and wherein, before the forming of the preform, the insert is taken over by at least one second holding means puncturing the wall of the preform, the second holding means being formed as a blowing pin and an expansion and forming of the preform taking place by applying pressure medium with the second holding means, and characterized in that the insert is attached to a single wall of the article by an advancing and/or withdrawing movement of the second holding means.

31. The method as claimed in claim 30, characterized in that the article to be produced is a motor vehicle fuel tank.

32. The method as claimed in claim 30, characterized in that a functional component carrier is introduced into the article as the insert.

33. The method as claimed in claim 30, characterized in that a stiffening element is introduced into the article as the insert.

34. The method as claimed in claim 30, characterized in that the insert is fused with the inner wall of the article.

35. The method as claimed in claim 30, characterized in that the second holding means passes through the insert.

36. The method as claimed in claim 30, characterized in that the second holding means is temporarily locked together with the insert.

37. The method as claimed in claim 30, characterized in that the second holding means is temporarily locked together with the insert.

38. A method for producing an article from thermoplastic material in which a tube-shaped preform is introduced into a multi-part blow mold and is expanded and formed by applying differential pressure, wherein, before the forming of the preform, at least one insert is introduced into the preform by means of a first holding means and wherein, before the forming of the preform, the insert is taken over by at least one second holding means puncturing the wall of the preform, the second holding means being formed as a blowing pin and an expansion and forming of the preform taking place by applying pressure medium with the second holding means, and characterized in that the second holding means is temporarily locked together with the insert.

39. The method as claimed in claim 38, characterized in that the article to be produced is a motor vehicle fuel tank.

40. The method as claimed in claim 38, characterized in that a functional component carrier is introduced into the article as the insert.

41. The method as claimed in claim 38, characterized in that a stiffening element is introduced into the article as the insert.

42. The method as claimed in claim 38, characterized in that the insert is attached to a single wall of the article by an advancing and/or withdrawing movement of the second holding means.

43. The method as claimed in claim 38, characterized in that the insert is fused with the inner wall of the article.

44. The method as claimed in claim 38, characterized in that the second holding means passes through the insert.

45. The method as claimed in claim 38, characterized in that the second holding means is temporarily locked together with the insert.

* * * * *